(12) United States Patent
Marchiori et al.

(10) Patent No.: US 10,328,537 B2
(45) Date of Patent: Jun. 25, 2019

(54) DEVICE FOR SUPPORTING AND/OR DRIVING MACHINES, INSTRUMENTS AND/OR STRUCTURES IN GENERAL, PARTICULARLY FOR SUPPORTING AND/OR DRIVING A TELESCOPE

(71) Applicants: EIE GROUP S.R.L., Venezia Mestre (IT); EIE GROUND TECHNOLOGIES S.R.L., Venezia Mestre (IT)

(72) Inventors: Gianpietro Marchiori, Venezia Carpenedo (IT); Simone De Lorenzi, Teolo (IT)

( * ) Notice: Subject to any disclaimer, the term of this patent is extended or adjusted under 35 U.S.C. 154(b) by 0 days.

(21) Appl. No.: 15/745,147

(22) PCT Filed: Jul. 18, 2016

(86) PCT No.: PCT/IB2016/054267
§ 371 (c)(1),
(2) Date: Jan. 16, 2018

(87) PCT Pub. No.: WO2017/009814
PCT Pub. Date: Jan. 19, 2017

(65) Prior Publication Data
US 2019/0009377 A1    Jan. 10, 2019

(30) Foreign Application Priority Data
Jul. 16, 2015    (IT) .............................. UB2015A2241

(51) Int. Cl.
*F16C 29/02* (2006.01)
*B23Q 1/38* (2006.01)
*F16F 15/027* (2006.01)
*F16C 32/06* (2006.01)

(52) U.S. Cl.
CPC ............ *B23Q 1/385* (2013.01); *F16C 29/025* (2013.01); *F16C 32/0666* (2013.01); *F16F 15/027* (2013.01)

(58) Field of Classification Search
CPC ..... F16C 29/025; F16C 32/0666; B23Q 1/385
See application file for complete search history.

(56) References Cited

U.S. PATENT DOCUMENTS 3,992,978 A * 11/1976 Petersen ............... F16C 29/025
                                                                91/47
3,994,367 A    11/1976 Christ
(Continued)

*Primary Examiner* — Thomas R Hannon
(74) *Attorney, Agent, or Firm* — Themis Law

(57) ABSTRACT

A device for supporting and/or guiding a first structure that includes machines, instruments and/or structures in general, particularly for supporting and/or guiding a telescope, relative to a second structure, includes a sliding system with a slide block adapted to slide relative to the second or the first structure; for a fluid, a chamber that is separate from and independent of the sliding system and that includes a first portion fixed to the sliding system and a second portion adapted to be associated with the first or the second structure; a fluid circuit that is also separate from and independent of the sliding system and that communicates with the chamber to control the passage of the fluid into and from the chamber; and an elastic member housed in the chamber to absorb the oscillations between the first and the second portion.

20 Claims, 5 Drawing Sheets

(56) References Cited

U.S. PATENT DOCUMENTS

Figure 1:
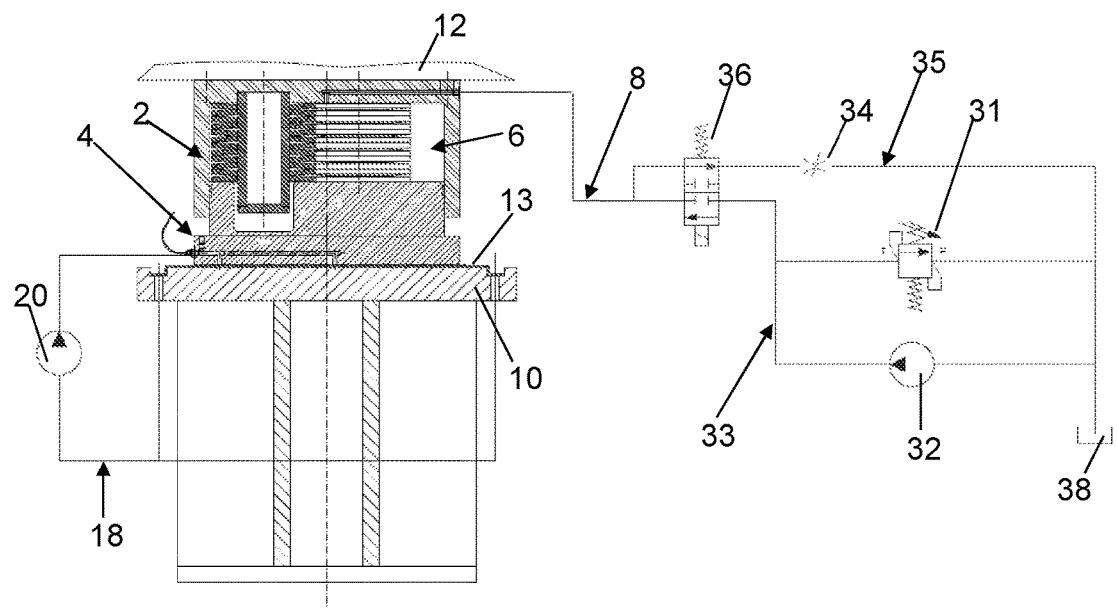

| | | | |
|---|---|---|---|
| 4,368,930 A * | 1/1983 | Duchaine | F16C 32/0666 |
| | | | 384/12 |
| 4,753,311 A * | 6/1988 | Berger | F16C 32/0662 |
| | | | 180/125 |
| 2004/0057639 A1 | 3/2004 | Roeders | |
| 2010/0329593 A1 | 12/2010 | Tomelleri | |
| 2016/0186802 A1 * | 6/2016 | Hashimoto | F16C 29/025 |
| | | | 384/12 |

* cited by examiner

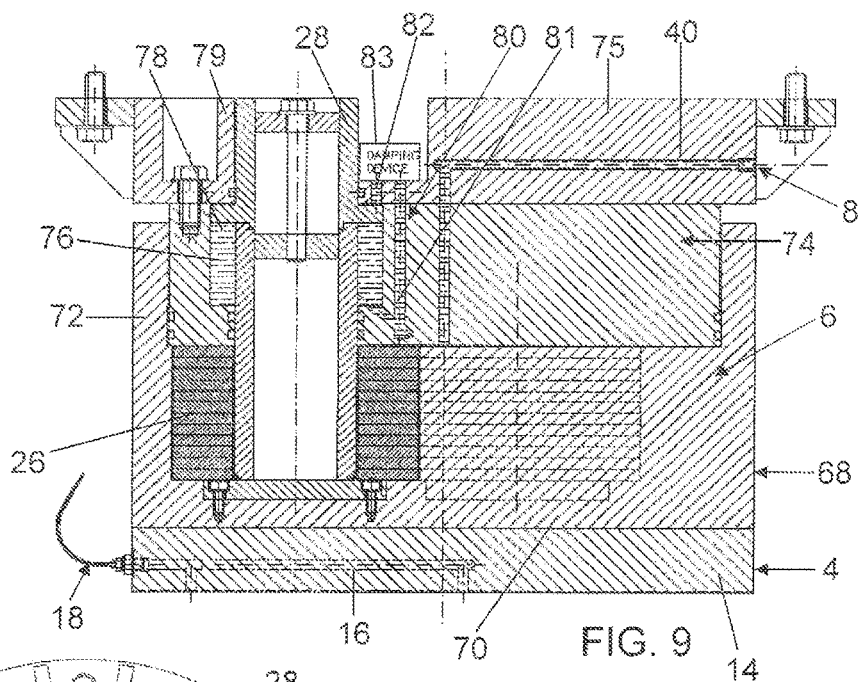
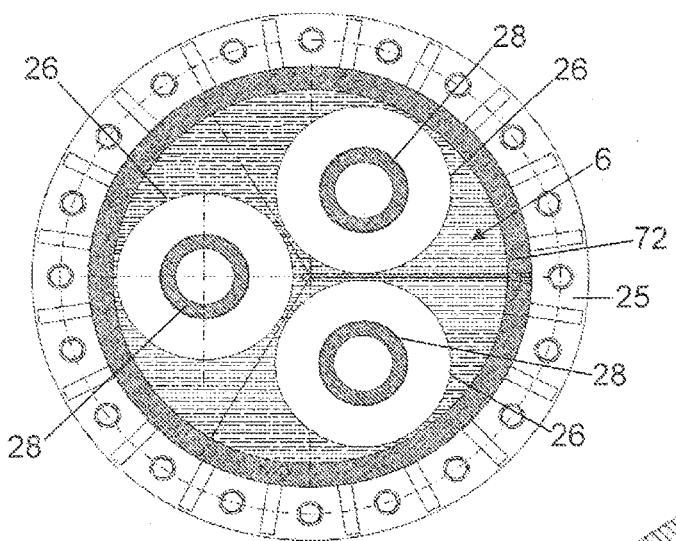
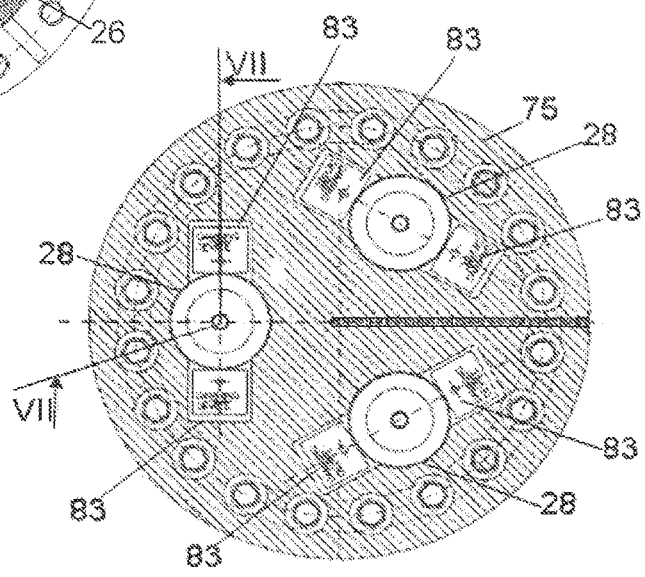
FIG. 9
FIG. 10
FIG. 11

DEVICE FOR SUPPORTING AND/OR DRIVING MACHINES, INSTRUMENTS AND/OR STRUCTURES IN GENERAL, PARTICULARLY FOR SUPPORTING AND/OR DRIVING A TELESCOPE

The present invention relates to a device for supporting and/or guiding machines, instruments and/or structures in general, particularly for a telescope.

Supports are known for machines, instruments and structures in general, for example a large-dimension telescope. A known type of support consists of a hydrostatic slide block with a ball joint. This solution comprises a body provided with a conduit which forms a film of pressurized lubricant able to withstand the load supported by said body.

This solution enables the overall system to undergo movement with very low friction, while at the same time maintaining high structural rigidity, which is unfortunately limited and sometimes compromised by the presence of the rear ball joint.

As an alternative to the ball joint, hydrostatic slide block supports have been proposed with an upper chamber filled with oil, which ensures greater rigidity than the ball joint.

In the case of installations in seismic zones or in zones characterised by the presence of vibrations or oscillations of considerable amplitude, structure over-dimensioning is generally used, together with suitable anchoring. However, this considerably increases costs.

In other cases, seismic isolators are used. However, even this solution is not completely satisfactory in that the isolators represent components which are external to and independent of the hydrostatic slide block support, and occupy space as they have to be inserted between the foundations and the elevated part of the structure. Moreover, they are particularly costly and, in any event, result in a considerable reduction in the overall rigidity of the system.

U.S. Pat. No. 3,994,367 describes a device enabling two elements 1, 2 to move relative to each other, both along a direction parallel to the facing surfaces of said elements and along a direction perpendicular to those. In particular, this device comprises a piston 31 slidable within a cavity 30 provided in one 1 of the two elements and which faces the flat surface 16 of the other element 2. Moreover, the piston 31 and the cavity 30 which houses it, define in their interior a chamber 21 for a lubricant fluid, in which elastic means 36 are also housed. In greater detail, in the base of the piston 31 facing said flat surface 16 of the other element 2, apertures 34 are provided for outflow of the fluid and are connected to, and interact hydraulically with, said chamber 21 containing the lubricant fluid.

This solution has the drawback of not enabling the two separate functions of rigid support and damping support to be selectively performed, as required in practice in the most varied situations.

An object of the invention is to provide a support and/or guide device for machines, instruments and structures in general, in particular for telescopes, which also internally incorporates the isolation function, in the sense of opposing the transmission of the oscillations to which the machine, the instrument or the structure are subjected.

Another object of the invention is to provide a support and/or guide device which also internally incorporates the function of damping, in the sense of reducing and dissipating the energy linked to the oscillations to which the machine, the instrument or the structure are subjected.

Another object of the invention is to provide a support and/or guide device which provides high structural rigidity.

Another object of the invention is to provide a support and/or guide device which on the basis of contingent requirements is able to behave selectively as a rigid support or as a damping support.

Another object of the invention is to provide a support and/or guide device which when under conditions of normal use behaves as a rigid support, while during events involving high vibrations and/or oscillations behaves automatically as a damping support.

Another object of the invention is to provide a support and/or guide device which is self-centring, in the sense that after an event involving considerable oscillations, such as an earthquake, it is able to independently return into the correct operating position.

Another object of the invention is to provide a support and/or guide device which is of simple, quick and low-cost production.

Another object of the invention is to provide a support and/or guide device which has an alternative characterisation, in both constructional and functional terms, relative to those of known type.

These and further objects which will be apparent from the ensuing description are attained, according to the invention, by a device with the characteristics indicated in claim 1.

Figure 2:
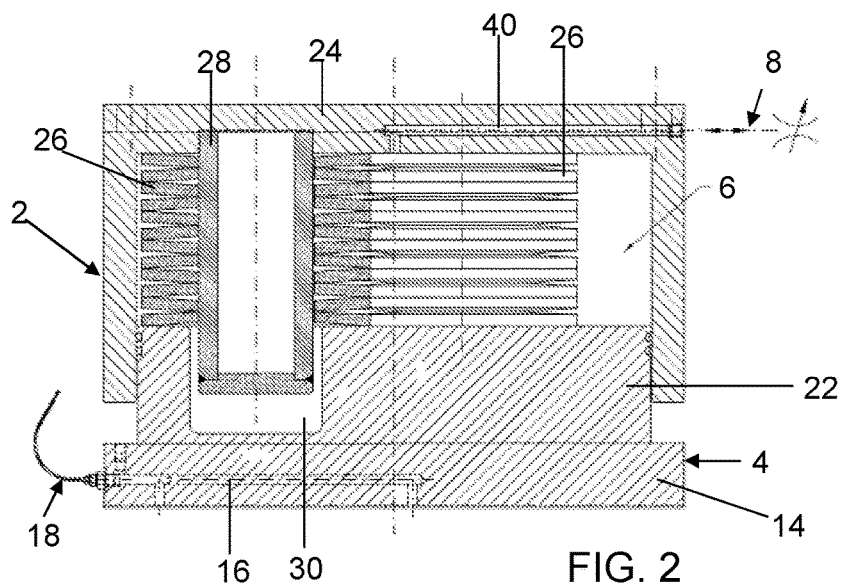
Figure 3:
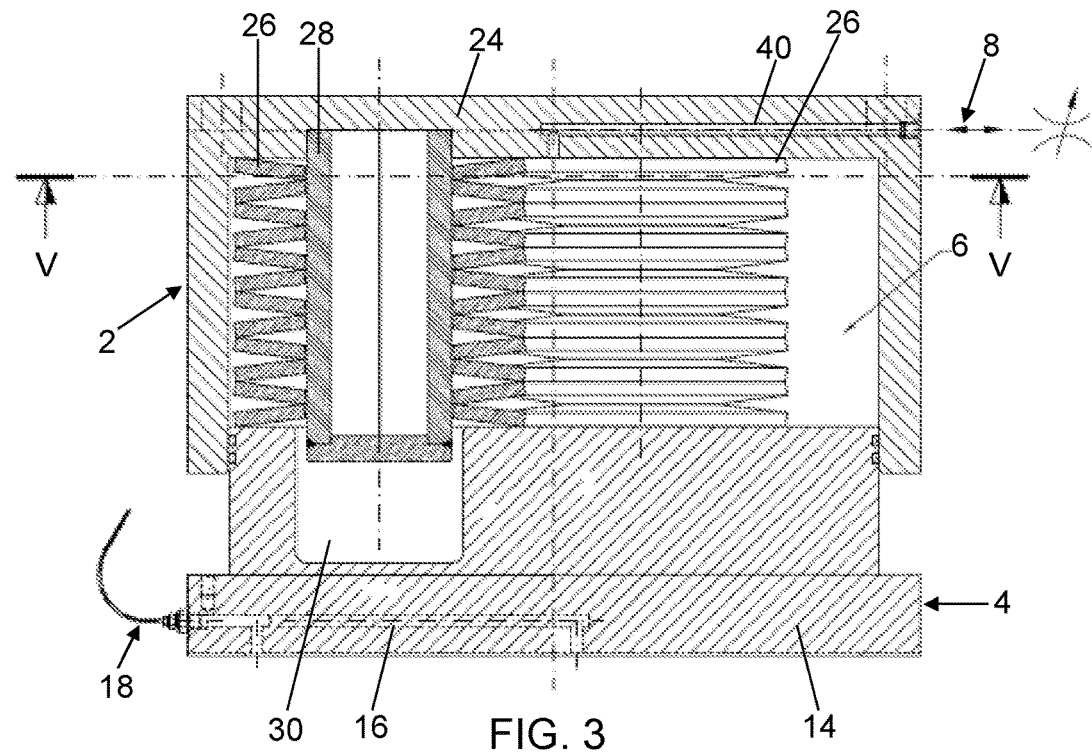
Figure 4:
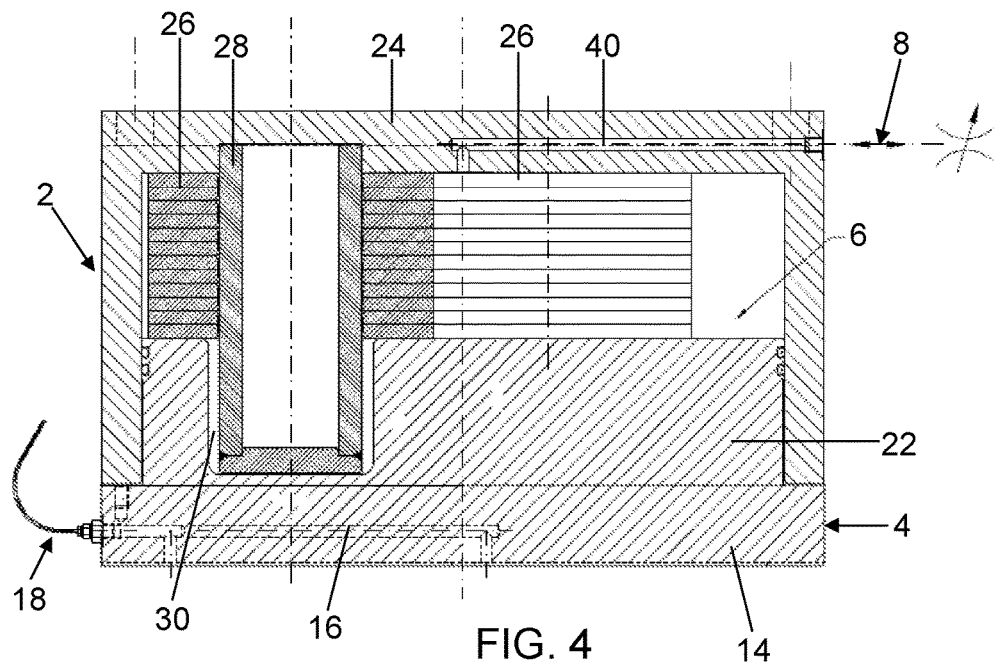
Figure 5:
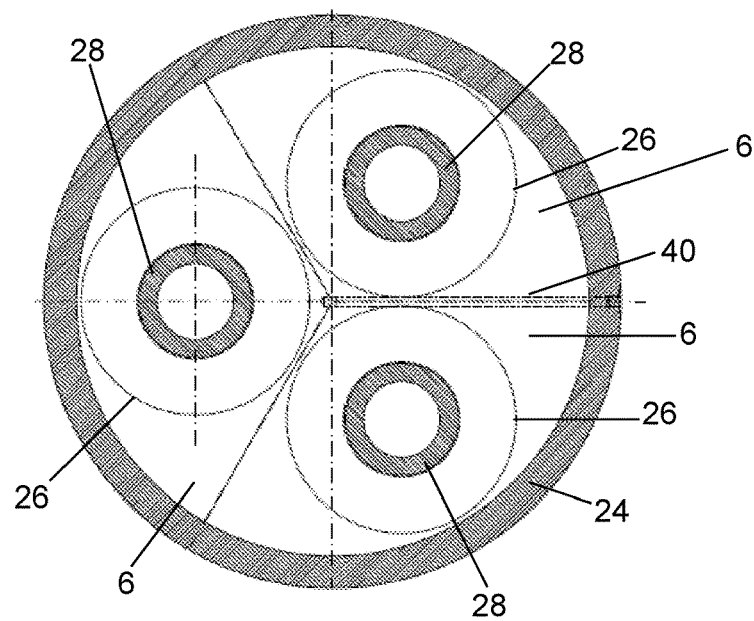
Figure 6:
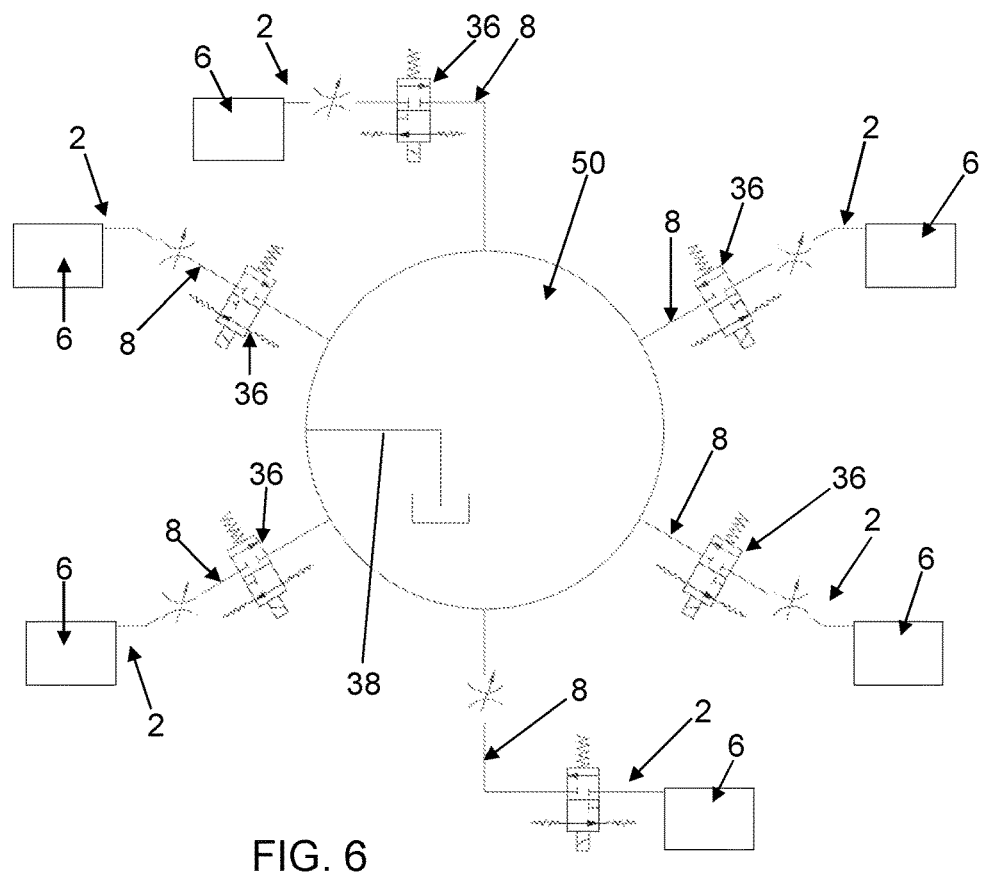
Figure 7:
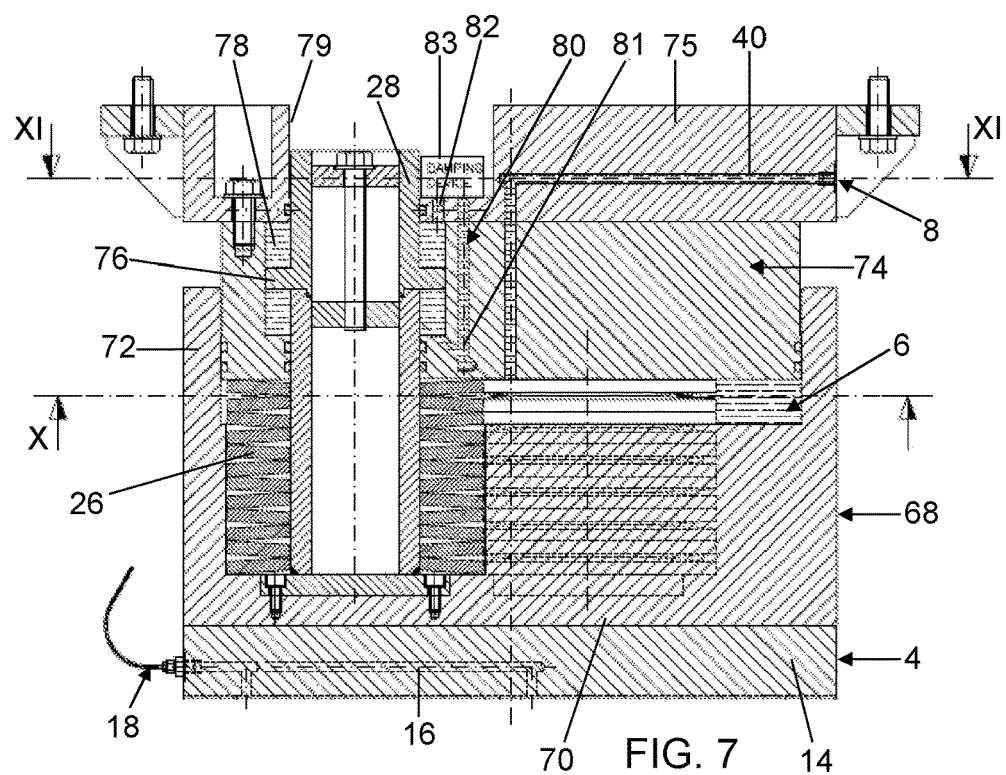
Figure 8:
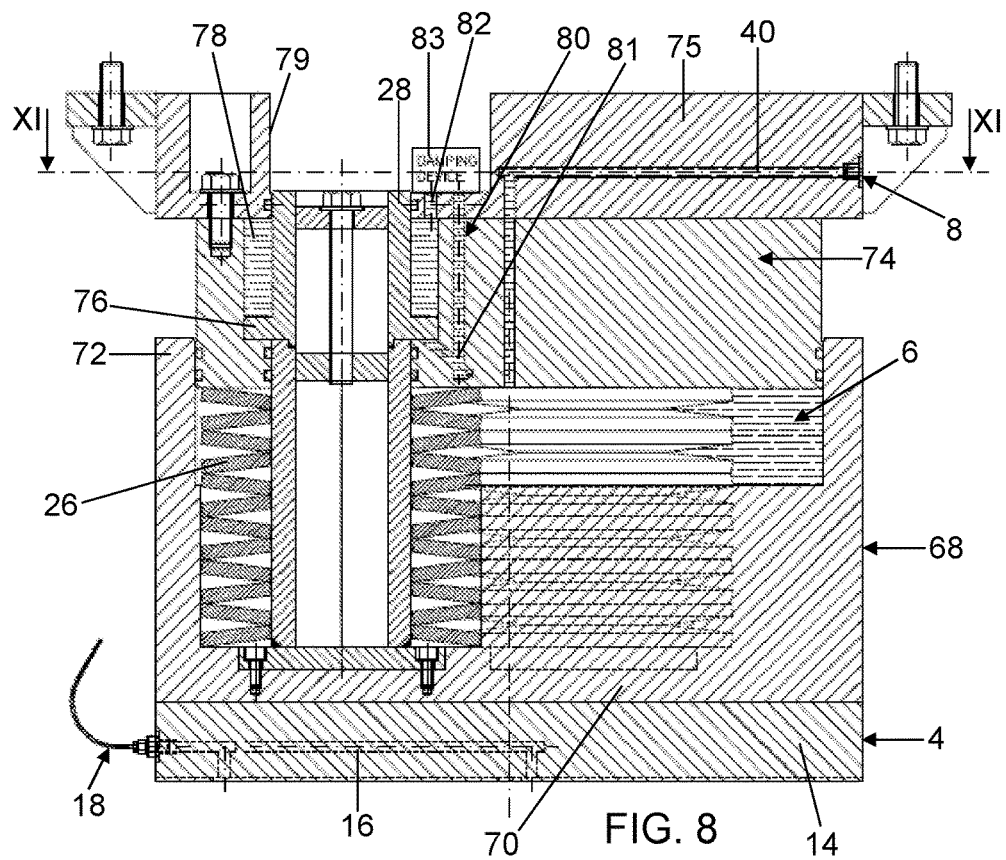

The present invention is further clarified hereinafter in terms of a preferred embodiment thereof, provided by way of non-limiting example with reference to the accompanying drawings, in which:

FIG. 1 is a vertical schematic section through the device according to the invention, FIG. 2 shows it with the elastic means in the rest position, FIG. 3 shows it with the elastic means totally discharged, FIG. 4 shows it with the elastic means totally loaded, FIG. 5 is a section on the line V-V of FIG. 3, and FIG. 6 is a schematic view of a system with several devices according to the invention, FIG. 7 is a section on the line VII-VII of FIG. 11 showing an alternative embodiment of the device according to the invention, with the elastic means in the rest position, FIG. 8 shows it in the same view as FIG. 7, with the elastic means completely discharged, FIG. 9 shows it in the same view as FIG. 7, with the elastic means completely loaded, FIG. 10 is a section therethrough taken on the line X-X of FIG. 7, and FIG. 11 is a section therethrough taken on the line XI-XI of FIG. 7.

As can be seen from the figures, the support and/or guide device 2 according to the invention, for machine tools, instruments and structures in general 12, including those of large-dimensions, comprises a lower sliding system 4, on which an upper chamber 6 associated with a fluid circuit 8 is mounted.

The machine tool, the instrument or the structure 12 to be supported and/or guided (defining or pertaining to a "first structure") rests on the upper surface of the chamber 6, while the lower sliding system 4 of the device 2 rests on an underlying fixed structure 10 (defining or pertaining to a "second structure").

The lower sliding system 4 comprises a slide block provided with means for its sliding relative to the underlying structure 10, which can be fixed but could also be movable. Preferably, said slide block is hydrostatic, but could also be a slide block of wheel type or of other type (e.g. of Teflon).

In particular, the lower sliding system of hydrostatic slide block type 4 comprises a base 14 within which a conduit 16 is defined, from which a pressurized fluid (e.g. hydraulic oil) emerges at the lower surface.

Hence, in this manner, between the base 14 and the underlying fixed structure 10, on which the entire device 2 rests, a fluid film 13, particularly of pressurized oil, is defined.

A second oil hydraulic circuit 18 is associated with a conduit 16 defined within the base 14, and after recovering the oil of said layer recirculates it under pressure by means of a pump 20.

The upper chamber 6 of the device 2 is bounded lowerly by an element 22 (defining a first portion or a lower portion), fixed to the base 14, and bounded upperly by a cover 24 (defining a second portion or an upper portion).

Elastic means 26 are housed in the chamber 6. In particular, these elastic means 26 are disposed within the chamber such as to absorb the oscillations of said cover 24, and hence of the corresponding associated machine/instrument/structure 12, relative to the element 22 fixed to the sliding system 4.

Preferably, the elastic means comprise one or more springs 26, each provided with a corresponding guide cylinder 28. In particular, each spring 26 is totally wound about a respective guide cylinder 28 and is interposed between the upper surface of the element 22 and the lower surface of the cover 24; in greater detail, the respective guide cylinder 28 is fixed upperly to the cover 24 and is housed with its lower end in a cavity 30 provided in the element 22 such that, when the cover 24 undergoes elastic oscillations relative to the element 22, it enters said cavity 30 to a greater or lesser extent due to the compression and expansion of the spring 26.

The springs 26 housed in the chamber 6 are sized such as to balance, in combination with the pressurized fluid present in the chamber 6, the external load to which the overall system is subjected, as defined by the device 2 and the machine or instrument or structure 12 supported by said device.

As stated, a fluid circuit 8, preferably oil hydraulic, is associated with the upper chamber 6 to control the passage of said fluid (for example hydraulic oil) into and from said chamber.

The fluid circuit 8 comprises a first subcircuit 33 provided with a first pump 32 and a first valves 31 which connect the upper chamber 6 to a tank 38 for the fluid. In particular, the first subcircuit 33 is arranged and controlled such as to maintain the chamber 6 filled with pressurized fluid to hence ensure suitable rigidity of the overall system defined by the device 2 and by the supported and/or guided machine/instrument/structure 12.

Advantageously, the fluid circuit 8 also comprises a damping subcircuit 35, provided with throttle valves 34 and/or regulator valves 36, which connect the upper chamber 6 to a tank 38 for the fluid. In particular, the damping subcircuit 35 is arranged and controlled such that, by making the fluid pass through the throttle valve 34 and/or the valve 36, both adjustable, the energy deriving from the oscillations of the upper cover 24 relative to the lower element 22 is dissipated.

In greater detail, a passage conduit 40 connecting the fluid circuit 8 to the interior of the upper chamber 6 is defined inside the cover 24. In this embodiment, both the subcircuits 33 and 35 are positioned outside said upper cover 24 and outside said lower element 22, and are both in communication with the interior of the chamber 6 via said conduit 40.

Advantageously, the presence of said elastic means 26 enables the overall system, defined by the device 2 and by the supported and/or guided machine/instrument/structure 12, to oscillate. Moreover, by varying the fluid flow passing into the damping subcircuit 35 of the fluid circuit 8, these oscillations are suitably damped.

In particular, the viscous damping coefficient for the oscillations of the device 2 can be preset by controlling the valves 36 and/or the throttle valve 34 of the damping subcircuit 35.

The dimensioning of the lower sliding system 4, the number of slide blocks 14 to be used, the number and type of springs 26, the presetting of the viscous damping coefficient, etc. are suitably defined on the basis of the characteristics of the installation site. In particular, the components of the device 2 are suitably dimensioned on the basis of the extent of the oscillations to be damped and on the operative rigidity to be guaranteed, and on the loads acting on the device itself.

In greater detail, as shown in FIG. 5, the upper chamber 6 can have a substantially cylindrical shape and comprise three springs 26, each of which is positioned in one of the three angular sectors into which the chamber is divided.

Advantageously, the device 2 can also comprise an electronic unit (not shown) for controlling and monitoring the valves 36 of the fluid circuit 8. The operation of the device according to the invention is apparent from the description.

If oscillations are absent, the device 2 is in a first configuration in which the subcircuit 33 of the fluid circuit 8 is controlled such that the upper chamber 6 is filled with fluid which is maintained under pressure.

This hence ensures a high rigidity of the overall system, defined by the device itself and by the supported and/or guided machine or instrument or structure 12; moreover, this compensates the shape errors, both in inclination and along the vertical axis, deriving from the inevitable surface irregularities present in the installation site.

In contrast, when large oscillations occur, such as those due to seismic shock, the device passes into a second configuration in which the damping subcircuit 35 of the fluid circuit 8 is made to expel in a controlled manner the fluid present in the upper chamber 6, hence enabling the entire system to oscillate about the mean equilibrium position of the elastic means 26, between a state of maximum extension (see FIG. 3) and a state of maximum compression (see FIG. 4).

During these oscillations generated by the elastic means 26, the fluid quantity present in the chamber 6 is suitably adjusted by the subcircuit 35, which hence induces the effect of viscous damping.

To cause the device 2 to pass between said first and second configuration, suitable means are provided, not shown, for the electronic or mechanical sensing of a signal which identifies the presence or the arrival of oscillations, in order to hence cause said device to pass between said first and said second configuration. Preferably, said sensing means are of passive mechanical type, for example based on the pressure of the fluid within the fluid circuit 8, and/or comprising traditional seismic sensors, for example accelerometers, position sensors, vibration sensors, etc.

Said sensing means are suitably incorporated and installed into the device itself, or are positioned outside the device and connected to the control unit of this latter.

Advantageously, after an event characterised by high oscillations, the device 2 can be returned to its first configuration by suitably regulating the fluid quantity to be made to enter/leave the chamber 6 by means of the fluid circuit 6.

The same procedure can also be used to centre the device at the time of its installation, so reducing the installation time of the entire system.

According to the embodiment shown in FIG. 6, the machine or instrument or structure 12 can be supported by a platform 50 fixed upperly to a plurality of devices 2 according to the invention.

Preferably, these devices 2 all use the same tank 38 for feeding fluid to the circuit 8.

Traditional sensors are associated with each device 2 to evaluate the state and position of each of these. The measurements obtained by said sensors are fed to a central control unit which then, following suitable processing, controls the regulator valves and/or throttle valves of the oil hydraulic circuits 8 associated with each device 2, such that they carry out initial centring or re-centring of the platform.

In an alternative embodiment of the upper chamber 6, as shown in Figures from 7 to 11, the chamber is defined by a lower portion 68 (which defines a first portion) and by an upper portion 74 (which defines a second portion). In particular, the lower portion 68 comprises a bottom 70, fixed to the base 14, and lateral walls 72, while the upper portion 74 is fixed upperly to an element 75 on which the machine/instrument/structure 12 to be supported is then rested.

The elastic means 26 are housed in the chamber 6 as already described; however, in this embodiment, the guide cylinder 28 of each spring 26 is fixed lowerly to the bottom 70 of the lower portion 68, whereas upperly it is free to pass through both a second chamber 78 provided in the upper portion 74, and pass through the aperture 79 defined in the element 75.

Moreover, the guide cylinder 28 upperly presents a flange 76 housed in the secondary chamber 78; the flange 76 has a radial dimension substantially corresponding to that of the cross-section through the secondary chamber 78, which is preferably of cylindrical shape.

The elastic means 26 housed in the chamber 6 act on the lower surface of the upper portion 74 such as to absorb the oscillations of this latter, and hence of the element 75 and of the associated machine/instrument/structure 12, relative to the lower portion 68.

Associated with the chamber 6 there is a fluid circuit 8 comprising only the first fluid subcircuit 33, as already described, which is arranged and controlled such as to maintain the chamber 6 filled with pressurized fluid to hence ensure suitable rigidity of the overall system defined by the device 2 and by the supported and/or guided machine/instrument/structure 12.

Advantageously, in this second embodiment, the damping subcircuit 80, the purpose of which is to damp the oscillations, is completely incorporated into and housed in the upper portion 74. In particular, the damping subcircuit 80 is independent and does not communicate with the first subcircuit 33 which, in fact, is disposed external to the portions 74 and 68, and communicates with the interior of the chamber 6 via the conduit 40 provided in the element 75 and in the upper portion 74.

In greater detail, the damping subcircuit 80 comprises a throttle valve or regulator valve 83, a first conduit 81 connected to the bottom of the secondary chamber 78, and a second conduit 82 connected to the upper base of the secondary chamber 78.

Following the movement of the upper portion 74 relative to the lower portion 68, opposed by the elastic means 26, the fixed flange 76 divides the secondary chamber 78 of the upper portion 74 into a lower part and an upper part, the volumes of which vary as a function of the position of the upper portion 74 relative to the lower portion 68.

In particular, during the upward travel of the upper portion 74 (see FIG. 8), the elastic means 26 are in their maximum extension state, and the fluid emerges from the lower part of the secondary chamber 78, passes through the conduit 81 and, after passing through the throttle/regulator valve 83, again enters the upper part of the secondary chamber 78 through the conduit 82.

In contrast, during the downward travel of the second upper portion 74 (see FIG. 9), the elastic means 26 are in their maximum compression state, and the fluid emerges from the upper part of the secondary chamber 78, passes through the conduit 82 and, after passing through the throttle/regulator valve 83, again enters the lower part of the secondary chamber 78 through the conduit 81.

Thus essentially, by controlling the throttle valve 83, the flow of fluid circulating in the damping subcircuit 80 is varied, and in this manner the energy deriving from the oscillations of the upper portion 74 relative to the lower portion 68 is suitably dissipated.

In the embodiments described and represented herein, the lower sliding system 4 of the support and/or guide device 2 rests on an underlying structure 10 (second structure), while the machine tool, the instrument or the structure 12 (first structure) to be supported and/or guided rests on the upper surface of the chamber 6, however, according to the present invention, this configuration can be suitably inverted in the sense that the machine tool, the instrument or the structure 12 to be supported and/or guided (first structure) rests on and slides relative to the sliding system 4, while the chamber 6 rests lowerly on the underlying structure 10 (second structure).

Furthermore, both this latter configuration, and the preceding configuration described and represented herein, can be suitably inclined laterally. In greater detail, these configurations can be inclined through an angle less than 90°, for example of about 45°, or even 90° (i.e. are disposed horizontally) to suitably guide said machine, instrument or structure 12. In other words, according to the present invention, two corresponding surfaces of the first structure 10 and of the second structure 12 can face each other vertically or horizontally, or can both be inclined through an angle of less than about 90° to the vertical.

Moreover, according to the present invention, the position of the support and/or guide structure 10 and that of the machine, instrument or structure 12 can be suitably inverted, in the sense that the structure 10 can be positioned upperly while the machine, instrument or structure 12 is positioned lowerly, such as to be substantially hanging from said structure 10.

From the aforegoing, it is apparent that the improved device according to the invention is particularly advantageous in that:
  it incorporates in its interior both the support function for the machine/instrument/structure and the isolation and damping function for any oscillations,
  it enables both construction and installation costs to be reduced,
  it is self-centring, in that the elastic means tend to always return the device into the mean equilibrium position,
  compared with the device of U.S. Pat. No. 3,994,367, it is more functional in that, by virtue of the facility for selectively performing the two separate functions of rigid support or damping support, it is able to satisfy the different requirements which may arise depending on circumstances; in greater detail, during installation it enables the support damping function to be excluded, which is instead essential if seismic events or general oscillatory phenomena are present.

The device according to the invention is particularly suitable for supporting a telescope, even of considerable dimensions, to be installed in seismic zones, but can be generally used for supporting machines, instruments and structures, even of considerable dimensions, to be installed in zones in which particularly large vibrations could be involved, such as those of a seismic event, or deriving from undulating movement, or from train passage.

The invention claimed is:

1. A device for supporting and/or guiding a first structure comprising a machine, an instrument, a structure, or a telescope, relative to a second structure, said device comprising:
   a sliding system with a slide block adapted to slide relative to said second structure, or to said first structure;
   for a fluid, a chamber which is separate from and independent of said sliding system and which comprises a first portion fixed to said sliding system, and a second portion adapted to be associated with said first structure or with said second structure;
   a fluid circuit, which is separate from and independent of said sliding system and communicates with said chamber to control a passage of said fluid into and from said chamber;
   an elastic element housed in said chamber and disposed and configured to absorb oscillations between said first portion and said second portion; and
   a damping subcircuit that is configured and controlled to dissipate energy deriving from said oscillations between said first portion and said second portion.

2. The device as claimed in claim 1, wherein said elastic element is disposed and configured to absorb the oscillations of said second portion relative to said first portion.

3. The device as claimed in claim 1, further comprising a first configuration, to be used in absence of oscillations external to the device, in which said chamber is filled with the fluid in pressurized condition, and said elastic element is at least partly compressed, hence rendering rigid a combination defined by said device and by said first structure comprising the machine, the instrument, the structure, or the telescope.

4. The device as claimed in claim 3, further comprising a first subcircuit, which is configured and controlled to maintain said chamber filled with the fluid in pressurized condition.

5. The device as claimed in claim 3, further comprising a second configuration, to be used in presence of oscillations external to the device, wherein, in said second configuration, said fluid circuit controls a quantity of the fluid present in said chamber causing said elastic element to oppose oscillatory movements between said second portion and said first portion.

6. The device as claimed in claim 5, further comprising an electronic control unit, which controls valves of the fluid circuit communicating with said chamber, and/or valves of the damping subcircuit.

7. The device as claimed in claim 6, further comprising a sensing system that electronically or mechanically senses a signal which identifies a presence or an arrival of the oscillations, thereby causing said device to pass between said first and said second configuration.

8. The device as claimed in claim 7, wherein said sensing system is incorporated into the device or is positioned externally thereto and is connected to the electronic control unit.

9. The device as claimed in claim 1, wherein said damping subcircuit is housed external to said second portion and said first portion.

10. The device as claimed in claim 9, wherein said damping subcircuit is configured to control the passage of the fluid entering and/or leaving said chamber.

11. The device as claimed in claim 1, wherein said damping subcircuit is incorporated into said second portion and/or into said first portion.

12. The device as claimed in claim 1, wherein said elastic element comprises at least one spring, which is housed in said chamber and is interposed between said second portion and said first portion.

13. The device as claimed in claim 12, wherein said elastic element comprises, for each spring, a guide cylinder which is positioned inside the spring.

14. The device as claimed in claim 12, wherein said at least one spring is configured to balance, in combination with the fluid in pressurized condition in the chamber, an external load to which a combination defined by the device and by the first structure comprising said machine, instrument, structure, or telescope to be supported and/or guided, is subjected.

15. The device as claimed in claim 1, wherein said sliding system comprises a hydrostatic slide block.

16. The device as claimed in claim 1, wherein said first structure and said second structure comprise corresponding surfaces which face each other vertically, horizontally, or are inclined to a vertical line by an angle of less than about 90°.

17. The device as claimed in claim 1, wherein said second structure comprises an underlying support or guide structure, said first structure being upperly associated with said second portion of said chamber.

18. A platform for supporting or guiding machines, instruments and structures,
   wherein said platform is supported or guided by at least two devices constructed in accordance with claim 1,
   said structure comprising at least one electronic supervision unit for command and control of oil hydraulic circuits of each of said at least two devices.

19. A method for centering, at a time of installation or after an event in which oscillations are present, a device that comprises:
   a sliding system with a slide block adapted to slide relative to a first or a second structure;
   for a fluid, a chamber which is separate from and independent of said sliding system and which comprises a first portion fixed to said sliding system, and a second portion adapted to be associated with said first structure or with said second structure;
   a fluid circuit, which is separate from and independent of said sliding system and communicates with said chamber to control a passage of said fluid into and from said chamber; and
   an elastic element housed in said chamber and disposed and configured to absorb oscillations between said first portion and said second portion,
   the method comprising:
   feeding said fluid into said chamber until said chamber is filled with said fluid, which is maintained under pressure.

20. The method as claimed in claim 19, further comprising the step of:

dissipating energy of the oscillations undergone by a combination of the device and a machine, instrument, structure or telescope to be supported or guided by causing said fluid to emerge from said chamber in a controlled manner, hence enabling said combination to oscillate about a mean equilibrium position of the elastic element provided in said chamber, between a state of maximum extension and a state of maximum compression.

* * * * *